KURT STEISSLINGER
HELMUT ETTISCHER
INVENTORS

United States Patent Office 3,304,848
Patented Feb. 21, 1967

3,304,848
LOCKING MEANS FOR THE COVER FLAP AND/OR MIRROR OF A SINGLE-LENS REFLEX CAMERA
Kurt Steisslinger, Stuttgart-Hedelfingen, and Helmut Ettischer, Ruit, Kreis Esslingen, Germany, assignors to Eastman Kodak Company, Rochester, N.Y., a corporation of New Jersey
Filed Sept. 15, 1964, Ser. No. 396,535
8 Claims. (Cl. 95—42)

This invention relates generally to locking mechanisms, and more specifically to an improved locking means for the cover flap and/or mirror of a single-lens reflex camera, or the like.

In prior known single-lens reflex cameras, the cover flap and/or mirror are rigidly locked in their blocking and viewing positions respectively by latches, slide members, or the like. One of the disadvantages of these rigid inflexible locking mechanisms is that the individual parts must be manufactured to an exceptionally close tolerance, and an exacting final adjustment must be made in order to obtain a faultless locking position. Applicants' invention is believed to obviate these and other disadvantages of the prior known locking mechanisms.

One of the objects of the present invention is to provide an improved locking mechanism for a cover flap and/or mirror of a single-lens reflex camera that eliminates the necessity for holding the manufacturing tolerances of the parts of the mechanism to close limits.

Another object of the invention is to provide an improved locking mechanism for a cover flap and/or mirror or the like that is of simple design and construction, thoroughly reliable and efficient in operation, and economical to manufacture.

Another object of the invention is to provide an improved locking mechanism for a cover flap and/or mirror of a single-lens reflex camera that effectively eliminates any undue noise, jarring or damage to the mechanism when it is returned to its normal blocking position.

Still another object of the invention is to provide an improved locking mechanism for a cover flap and/or mirror of a single-lens reflex camera in which a resilient means is interposed between the locking member and an actuating member to automatically take up any wear in the parts, and to eliminate the necessity of any final adjustment between the locking members and the cover flap and/or mirror, while assuring a permanent and perfect sealing contact between the cover flap and/or miror and their supports.

Figure 1:
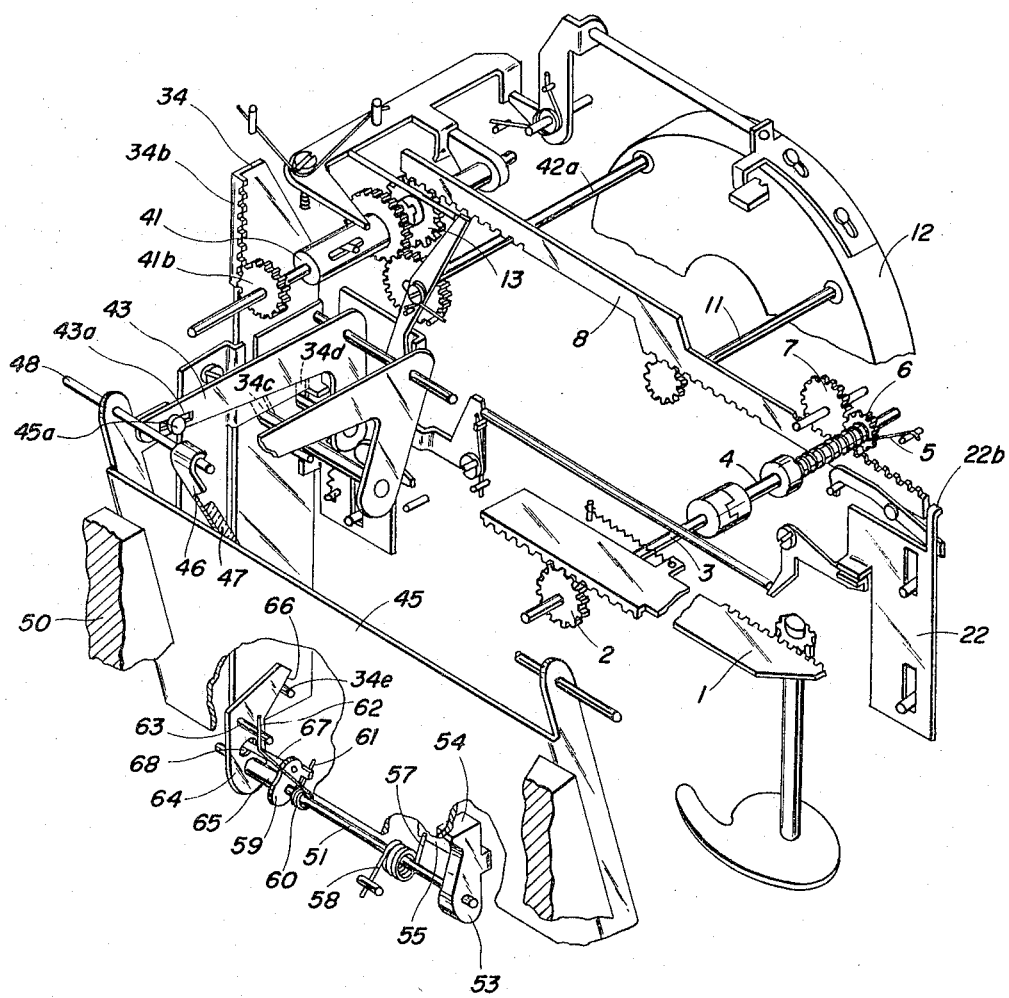
Figure 2:
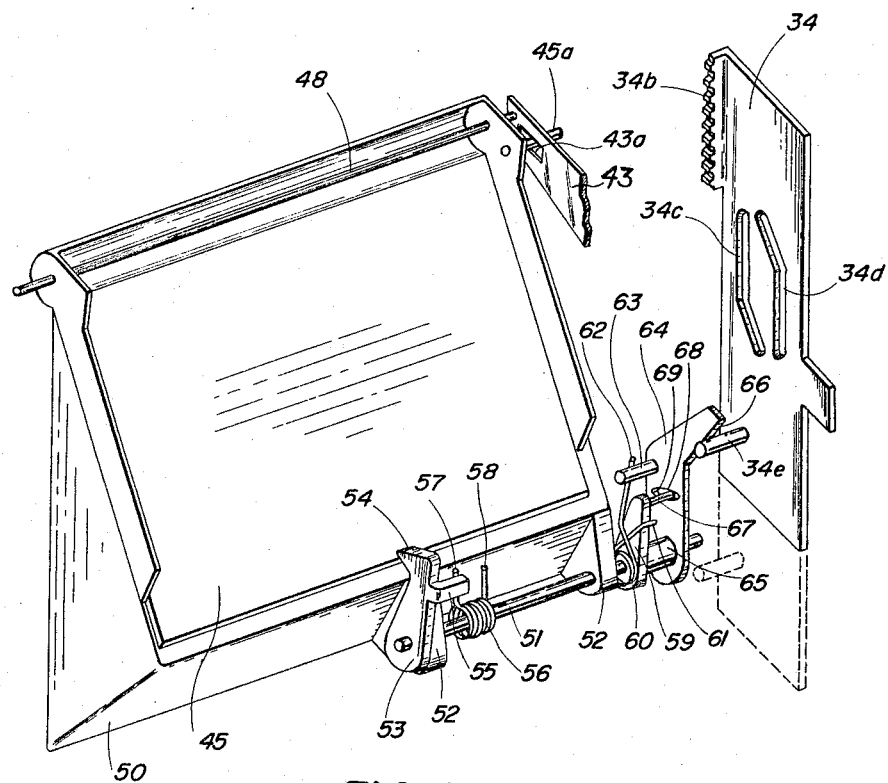

Objects and advantages other than those set forth above will be apparent from the following description when read in connection with the accompanying drawings, in which:

FIG. 1 is a schematic view in perspective of a single-lens reflex camera in which a preferred embodiment of a locking mechanism is incorporated; and FIG. 2 shows a segmental view in perspective of a portion of said reflex camera showing the locking mechanism in a locked position, other portions of the reflex camera being omitted for purposes of clarity.

Referring to the drawings, a single-lens reflex camera is disclosed having a between-the-lens shutter 12 of a well known type in the art. The camera further has a film winding mechanism 1, 2 which when operated to advance the film, cocks an actuating mechanism 3-8, which during movement to its cocked position, cocks the shutter 12 and moves the shutter and diaphragm blades, not shown, to their maximum aperture positions through shafts 11, 42a respectively. The camera further has a release mechanism 22, 22b for the actuating mechanism, which when released moves the shutter blades to their closed position, the diaphragm blades to their preselected position, the cover flap 45 and mirror support 46 and mirror 47, only a portion of which are shown, to their inoperative positions, and then releases shutter 12 which opens and closes to make an exposure. Since the above-described reflex camera mechanism forms a part of the invention only in an environmental way, it will not be described and disclosed in detail in this application. In addition, such mechanism is completely disclosed in a copending application Serial Number 396,503 filed concurrently by this inventor as one of the co-inventors.

A preferred embodiment of a locking mechanism according to the present invention is disclosed in connection with the aforementioned single lens reflex camera, of which only a portion of the camera housing 50 is shown. Since the locking mechanism is the same for both the cover flap 45 and mirror support 46, only the cover flap locking mechanism is shown, the complete mirror and its locking mechanism being omitted for purposes of clarity. Although the invention is being shown in connection with a reflex camera, it should be obvious that it could have utility in any type of application in which a flap member or the like is movable between two positions and releasably locked in one of them.

The camera housing 50 has an image aperture therein in alignment with the optic axis and which is covered by cover flap 45 pivotally mounted on a shaft 48. The cover flap 45 is pivotally movable between a closed or blocking position as seen in the drawing for blocking the light rays passing through the aperture, and an open or unblocking position allowing the light rays to pass through the aperture by means of a lever 43 connected to cover flap 45 through a pin 45a and slot 43a connection. Since the mechanism for moving cover flap 45 between is blocking and unblocking positions forms a part of the invention only in an environmental way, it is not described and disclosed in detail in this application. In addition, such mechanism is completely disclosed in the aforementioned copending application Serial Number 396,503 filed by the same inventors.

The control member for the locking mechanism comprises a reciprocally movable slide member 34 which is normally in the full line position as shown in FIG. 2 of the drawing. The camera in this instance is in its viewing position with cover flap 45 in its closed position, and the mirror, not shown, in its viewing position so that the operator can view any suitable subject which is to be photographed. When the camera is released to make an exposure, the slide member 34 is moved downwardly by a drive mechanism 8, 13, 41 and 41b in engagement with gear rack 34b causing the locking mechanism to release cover flap 45 which is moved by its mechanism to its inoperative position. Since the mechanism for moving slide member 34 does not form a part of the claimed invention, it is not disclosed in this application. Such mechanism is further completely disclosed and described in applicants' aforementioned copending patent application.

The locking mechanism interposed between cover flap 45 and slide member 34 comprises a shaft 51 rotatably supported by projections 52 on housing 50, and having a lock member 53 secured to one end thereof. The lock member 53 has a hook 54 at one end for engaging the lower edge of cover flap 45 and urging it into sealing engagement with housing support 50 when lock member 53 is moved to its locking position. The lock member 53 further has a lug 55, and a spring 56 which encircles shaft 51 with one end 57 of spring 56 engaging lug 55 and the opposite end 58 bearing against housing 50 for urging lock member 53 in a clockwise direction as viewed in FIG. 2 to its unlocked position. An arm 59 is secured to shaft 51, and a spring 60 encircles shaft 51 with one end 61 thereof in engagement with one side of arm 59, and the opposite end 62 in engagement with a pin 63 on a lever 64 having a hub 65 pivotally mounted on shaft 51. The spring 60 urges lever 64 in a clockwise direction as viewed in FIG. 2 causing an edge 66 thereof to engage a pin 34e mounted on slide member 34. The arm 59 further has a pin 67 secured thereto that extends into an elongated slot 68 in lever 64 for a purpose to be explained hereinafter. Since spring 60 is stronger than spring 56, it urges arm 59, shaft 51 and lock member 53 in a counterclockwise direction as viewed in FIG. 2 into its locking position against the bias of spring 56. When slide member 34 is moved downwardly to its dotted position upon release of the camera to make an exposure, the lever 64, by virtue of spring 60, tends to follow pin 34e as slide member 34 is moved downwardly until one end 69 of slot 68 engages pin 67. At such time, spring 60 merely holds lever 64 and arm 59 together as one unit and no longer acts in opposition to spring 56. Accordingly, spring 56 urges lock member 53, shaft 51, arm 59 and lever 64 as a unit in a clockwise direction following pin 34e, and into an unlocking position for releasing cover flap 45. A control groove 34d for cover flap 45 is positioned in a predetermined relation to pin 34e so that the flap moving mechanism 43 does not begin to move cover flap 45 to its unblocking position until pin 34e has allowed the locking mechanism to move to its unlatched position.

When slide member 34 is returned to its initial position as seen in full lines in the drawing, upward movement thereof initially returns cover flap 45 to its blocking position. Subsequently, the mirror 47 is swung to its viewing position by control groove 34c. The pin 34e moves lever 64, arm 59, shaft 51, and lock member 53 as a unit in a counterclockwise direction as viewed in FIG. 2 against the bias of spring 56 until hook 54 engages the edge of cover flap 45 and urges it into sealing engagement with camera housing 50. The last portion of the return movement of slide member 34 pivots lever 64 further in a counterclockwise direction moving end 69 of slot 68 away from pin 67. Consequently, spring 60 urges the locking mechanism into its locking position against the bias of spring 56. The pin 67 and slot 68 connection automatically takes up or accommodates all of the manufacturing tolerances in the parts without affecting its operation.

It is necessary in this mechanism for spring 56 to be weaker than spring 60 to operate properly. However, it is within the scope of the invention to position spring 56 so that it acts on arm 59 instead of lock member 53. In addition to aiding the accommodation of any manufacturing tolerances that may exist, spring 60 decelerates the working mass of slide member 34 as it is moved back to its initial position to effectively eliminate undue noise, jarring or damage to any of the parts.

The invention has been described in detail with particular reference to a preferred embodiment thereof, but it will be understood that variations and modifications can be effected within the spirit and scope of the invention as described hereinabove and as defined in the appended claims.

We claim:

1. In an improved locking mechanism for a cover flap or the like that is movable between operative and inoperative positions, the combination comprising:

locking means movable between a locking position in which it locks said cover flap in an operative position, and an unlocking position in which it unlocks said cover flap for movement to its inoperative position;

first resilient means for biasing said locking means toward its unlocking position; and actuating means having a lost motion connection with said locking means, and including a second resilient means interconnecting said locking means and actuating means, and having a force greater than said first resilient means, said actuating means being movable between a first position in which said second resilient means is effective to move said locking means to its locking position against the bias of said first resilient means, and a second position in which said second resilient means is disabled and said first resilient means is effective to move said locking means to its unlocking position.

2. The invention according to claim 1 wherein said actuating means comprises a lever movable relative to said locking means, said lost motion connection comprises a pin on one of said lever and locking means extending into a slot on the other of said lever and locking means, and said second resilient means biases said lever and locking means toward one another.

3. The invention according to claim 2 wherein said locking means comprises a rotatable shaft, a lock member secured to one end of said shaft for pivotal movement between said locking and unlocking positions, said first resilient means comprises a first spring encircling said shaft and connected to said lock member for biasing said lock member toward its unlocking position, said locking means further having an arm secured thereto, said actuating means comprises a lever pivotally mounted on said shaft, said second resilient means comprises a second spring interconnecting said lever to said arm for urging the two toward one another, and said lost motion connection comprises a pin on one of said lever and arm extending into a slot in the other of said lever and arm.

4. The invention according to claim 3 and further including control means for said actuating means for controlling the movement of said actuating means between its first and second positions.

5. In a single-lens reflex camera, the combination comprising:

a mirror and light blocking flap pivotally movable between operative positions in which they respectively reflect and block light rays entering said camera, and normal inoperative positions in which they are removed from the path of said light rays;

locking means for each of said mirror and light blocking flap and movable between a locking position for locking said mirror and flap in their operative positions, and an unlocking position for movement of said mirror and flap to their inoperative positions;

first resilient means for biasing said locking means toward its unlocking position; and actuating means having a lost motion connection with said locking means, and including a second resilient means interconnecting said locking means and actuating means, said second resilient means having a force greater than said first resilient means, said actuating means being movable between a first position in which said second resilient means is effective to move said locking means to its locking position against the bias of said first resilient means, and a second position in which said second resilient means is disabled and said first resilient means is effective to move said locking means to its unlocking position.

6. The invention according to claim 5 wherein said actuating means comprises a lever movable relative to said locking means, said lost motion connection comprises a pin on one of said lever and locking means extending into a slot on the other of said lever and locking means, and said second resilient means biases said lever and locking means toward one another.

7. The invention according to claim 6 wherein said locking means comprises a rotatable shaft, a lock member secured to one end of said shaft for pivotal movement between said locking and unlocking positions, said first resilient means comprises a first spring encircling said shaft and connected to said lock member for biasing said lock member toward its unlocking position, said locking means further having an arm secured thereto, said actuating means comprises a lever pivotally mounted on said shaft, said second resilient means comprises a second spring interconnecting said lever to said arm for urging the two toward one another, and said lost motion connection comprises a pin on one of said lever and arm extending into a slot in the other of said lever and arm.

8. The invention according to claim 7 and further including control means for said actuating means for controlling the movement of said actuating means between its first and second positions.

References Cited by the Examiner

UNITED STATES PATENTS

| | | | |
|---|---|---|---|
| 1,272,292 | 7/1918 | Menns | 94—42 |
| 2,579,247 | 12/1951 | Angenieux | 95—42 |
| 2,952,197 | 9/1960 | Goshima | 95—42 |
| 3,221,626 | 12/1965 | Fuketa | 95—42 |
| 3,240,136 | 3/1966 | Fujimori | 95—42 X |

JOHN M. HORAN, *Primary Examiner.*